Feb. 2, 1926.
J. H. BAIR
1,571,465
ROTARY ENGINE VALVE
Filed March 9, 1922
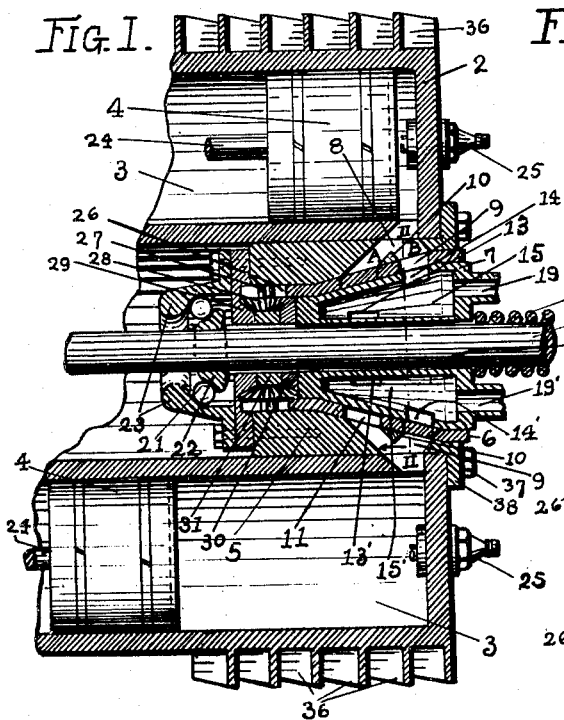
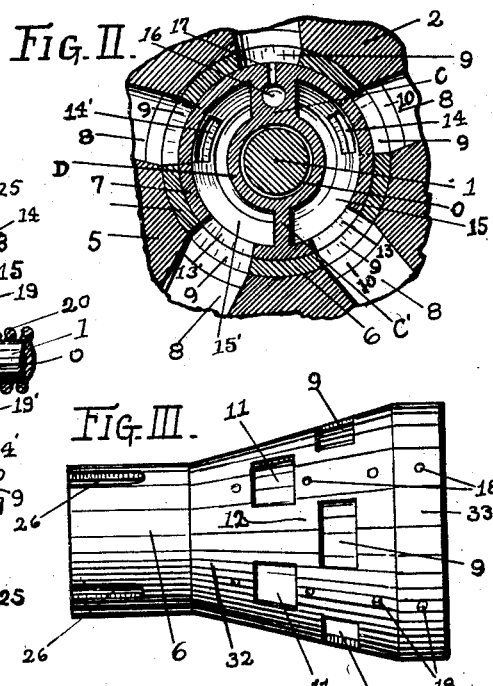
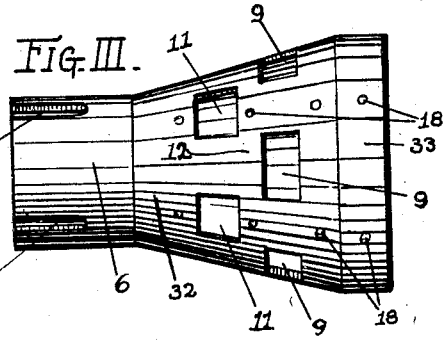
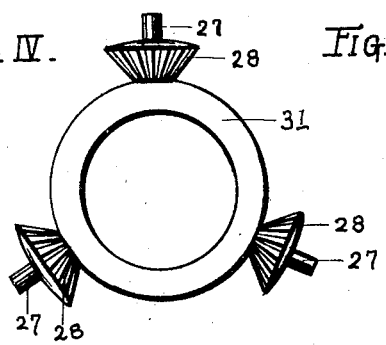
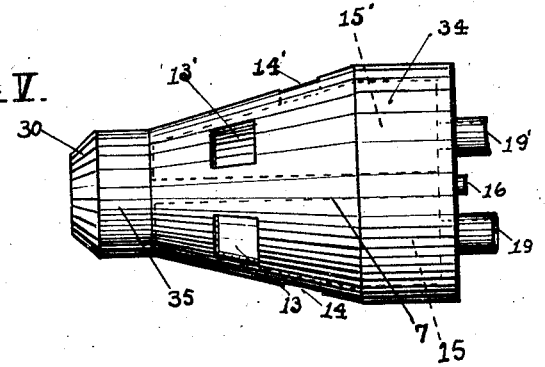
Joseph H. Bair — INVENTOR.
BY
Augustus B. Stoughton. — ATTORNEY.

Patented Feb. 2, 1926.

1,571,465

UNITED STATES PATENT OFFICE.

JOSEPH H. BAIR, OF CAMP HILL, PENNSYLVANIA.

ROTARY ENGINE VALVE.

Application filed March 9, 1922. Serial No. 542,271.

*To all whom it may concern:*

Be it known that I, JOSEPH H. BAIR, a citizen of the United States, and residing at Camp Hill, Pennsylvania, have invented certain new and useful Improvements in Rotary Engine Valves, of which the following is a specification.

The invention pertains to rotary timing valves adapted to be used on any rotary internal combustion engine of an odd number of piston cylinders and it is immaterial whether these cylinders are radially or axially disposed.

The invention consists of three cone-shaped parts each having ports and seated together so they conform to each other and are relatively rotatable by a gear arrangement so that their ports mesh periodically in a predetermined manner but at all other times maintain closure so as to fulfill all requirements of intake and exhaust, suction and compression necessary in internal combustion engines.

The outer member of the valve combination is made to be tightly inserted into a recess in the closed end of the cylinder casting in such a way that its ports register with the respective ports of the cylinders and that it is otherwise leak proof. This port shell is held in this position by bolts, so that it is integral with the cylinder bearing part. The inner face of this insert is for the most part tapered with the big and little ends straight. The entire inner surface is ground as is also the outer surface of the next or intermediate part which conforms to it and with it is pressure proof at the line of contact. This intermediate part is a shell and has its outside and inside conical walls substantially parallel. Into this is inserted the inner or two chambered part and forms with it a pressure proof contact. All these three parts have ports which, by means of the gear arrangement, register at intervals in the manner to be described.

The invention is further disclosed by means of drawings of which:

Figure I is a plan view of a selected portion of the engine in horizontal section so as to show the working relation of the valve to the rest of the organization.

Figure II is a tranverse section of valve assembled and on the line II—II of Figure I.

Figure III is the intermediate ported shell of the valve.

Figure IV represents a ring with pinions which controls the rotation of the intermediate member by meshing with gears on the other two members of the valve.

Figure V is the inner member of the valve viewed from below which is the stationary part of the valve and which has fixed on it a gear to co-operate in the rotation of the other members.

1 is the shaft or axis upon which engine 2 rotates by means of a thrust bearing having its cone member 21 fixed, or threaded on the shaft 1, its other member 23 fast on the engine and its balls 22 interposed. The inner member of the valve 7 is held seated so as to maintain pressure closure by means of a spring 20 and together with the timing gear arrangement is clear of the shaft 1 and maintains a space 0, so that any vibration will not add friction to the valve part 7, nor to the gear ring 31, in other words, this arrangement obviates forming a bearing out of the valve. The valve members are nested into each other and no amount of vibration will unseat them.

The cylinder 3 communicates with the valve by means of a port 8. This port continues through the outer member 5 of the valve which is held in registration by means of screws 37 through flange 38 into the engine. This port 8 is divided longitudinally into two parts, A and B, by means of a web 10, of which B is in the line of rotation of ports 9 of the intermediate valve member 32 (shown in detail in Figure III) and A with ports 11. This web 10 forms a friction surface and closure with the ring 12 between ports 9 and 11. While the twin ports A and B, separated by web 10 in the outer part 5 are opposite each other and axially in line with those of the intermediate part 32, namely 9 and 11, in their path of rotation are staggered or alternate with each other.

There are four ports on the inner member 7. Two of these 13 and 13′ are in line of rotation respectively with A and 11 and the other two 14 and 14' with B and 9. 19 is the intake pipe connecting the carburetor with chamber 15 and ports 13 and 14, 19' is the exhaust pipe from exhaust chamber 15' having exhaust ports 13' and 14'. The intermediate part 32 and the inner part 7 which are tapered have straight ends 33 and 6, and 34 and 35 (which conform to each other and to the recess in the outer member 5) and have for their purpose the maintenance of closure. Were the taper extended to the end the pressure of explosion, being in an oblique direction, would tend to lift them from their seating and allow escape of compression. The cylindrical ends prevent this while the taper portions upon which are the ports allows take up from wear.

The inner member 7 has fast upon its end 35 a gear 30. Since this part is non-rotatable the gear is stationary. Upon the outer part 5 is fixed the companion gear 29 and it rotates with the engine 2. These two gears co-operate with each other by means of the ring 31, having mounted thereon on the spindles 27 pinions 28 through which they intermesh. The ring, with pinions, slips into part 32 at end 6 and the posts 27 extend through the longitudinal slots 26. The result is that when running the timer 32 revolves at half the speed and in the same direction as the engine.

The timing operation is as follows, assuming there are five cylinders: The cylinder vertically above the axis has the piston all the way in. The exhaust has all been pushed out by means of port connection maintained between the cylinder and the exhaust chamber during the instroke of the piston, and until this instant when the piston starts its outward stroke, and port connection with the intake chamber, and carburetor, is established and maintained until the out stroke is completed and the in or compression stroke has begun and until the cylinder port has passed the center about 36 degrees. This gives the gas full chance to inflow from the suction produced even after the outer piston movement has stopped. This meets the requirements now universally conformed to in valve timing. Now all the port connection with the cylinder in question is closed until the instroke is completed, the firing takes place and the piston is driven out. The exhaust starts before the valve has passed over the low center or before the out stroke is completed. The engine has made two revolutions and is four cycle. On the outstroke side one cylinder intakes and the next one fires and this alternation continues while on the instroke side one cylinder compresses while the next one exhausts. The engine having five cylinders, the order of firing is 1, 3, 5, 2, 4, 1.

The valve, and the bearing, is oiled as follows: By means of a pump which is connected by means of a pipe (not shown) to a pressure chamber 16 in the partition C of the inner member 7 of the valve the oil is forced out periodically five times in a revolution through glands 17 which that often register with oil ports 18 in part 32 and with similar ports in outer part 6 (not shown in the drawings). These ports in five axial rows and respectively in line of rotation with those of parts 32 and 7 superpose all the holes of a row with those 17 of inner member 5. Thus in a revolution all the members of each row of holes are successively registered with those from the supply under pressure. In part 5 a rearward extending canal connecting all the holes in a row conducts the surplus oil back and at its open mouth pours it over the thrust bearing from whence it drains back into the reservoir.

This application pertains to an improvement on a rotary internal combustion engine the details of which are disclosed in U. S. Patents Nos. 1,326,833—1,331,177—1,331,478 and 1,377,383.

Having now disclosed my improvements, I claim:

1. In a rotary engine valve the combination of an outer member, a stationary two chambered inner member and an interposed member all conforming together by means of a taper and cylindrical ends provided thereon and each member having ports to register successively, and a gear arrangement for controlling their speed, substantially as described.

2. In a rotary engine valve the combination of an outer member and an intermediate member and a stationary inner member all nested together and each having ports to register and close in relation to the ports of each other in their related rotation, and timing gearing, substantially as described.

3. In a rotary valve an outer member, an intermediate and a stationary inner member and a differential gear to regulate the speed of the intermediate member at half that of the outer member as described.

4. In a rotary valve the combination, an outer member having the port from each cylinder divided by a closure web extending across in the direction of the travel of the member, an intermediate member, a closure web bearing two sets of ports separated from each other the distance of the width of the web of the outer member and staggered to each other and an inner, a stationary member bearing four ports two of which are in the line of travel of one of the series of ports of the intermediate member and two in that of the other substantially as described.

5. In a rotary valve comprising three members, namely a stationary inner member, an intermediate and an outer and turning relations between them the combination, an oil gland maintained under pressure on the stationary member and a line of ports leading therefrom, rows of ports on the intermediate member periodically to register with the ports connected with the gland and rows of ports periodically to register with the intermediate member on the outer member each row thereof communicating with an outlet duct as described.

6. A rotary engine valve structure for a rotary engine, a shaft on which said engine rotates, a valve free of the shaft and turnable in a bearing provided in the engine, and gearing to operate the valve.

JOSEPH H. BAIR.